US012809611B2

(12) United States Patent
Kotary et al.

(10) Patent No.: US 12,809,611 B2
(45) Date of Patent: Nov. 24, 2026

(54) STAGED ACTIVATION OF FIRMWARE IN A COMPUTING SYSTEM

(71) Applicant: Microsoft Technology Licensing, LLC, Redmond, WA (US)

(72) Inventors: Karunakara Kotary, Redmond, WA (US); Venkatesh Ramamurthy, Redmond, WA (US); Nagasubramanian Gurumoorthy, Leander, TX (US); Ankur Garg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 18/427,048

(22) Filed: Jan. 30, 2024

(65) Prior Publication Data

US 2025/0244987 A1 Jul. 31, 2025

(51) Int. Cl.
*G06F 8/65* (2018.01)

(52) U.S. Cl.
CPC .................................... *G06F 8/65* (2013.01)

(58) Field of Classification Search
CPC ........................................................ G06F 8/65
See application file for complete search history.

(56) References Cited

U.S. PATENT DOCUMENTS 9,858,412 B2 * 1/2018 Kotary ................ G06F 12/1408
11,243,589 B1 * 2/2022 Bowen ...................... G06F 8/65
11,321,077 B1 * 5/2022 Sakthikumar ........... G06F 8/656
12,008,359 B2 * 6/2024 Jayakumar ............ G06F 21/572
12,099,861 B2 * 9/2024 Li ....................... H04L 41/0663
2016/0266894 A1 * 9/2016 Panicker ................. G06F 8/656
2017/0090897 A1 * 3/2017 Veereshwara ........... H04L 67/34
2019/0042229 A1 * 2/2019 Kotary ...................... G06F 8/65
2020/0257518 A1 * 8/2020 Liedtke ...................... G06F 8/65
2021/0240489 A1 * 8/2021 Xie ....................... G06F 21/572
2022/0188419 A1 * 6/2022 Stremlau ................... G06F 8/65
2022/0245251 A1 * 8/2022 Sfadia ........................ G06F 8/65
2023/0130694 A1 * 4/2023 Savage ................. H04L 9/3263 713/2
2024/0103832 A1 * 3/2024 Chandrasekaran .......................... G06F 11/1433
2024/0231801 A1 * 7/2024 Banik ................... G06F 1/3212
2024/0289494 A1 * 8/2024 Xu .......................... G06F 21/64

* cited by examiner

*Primary Examiner* — Lewis A Bullock, Jr.
*Assistant Examiner* — Theodore E Hebert

(57) ABSTRACT

Examples of the present disclosure describe systems and methods for implementing a time-synchronized firmware activation system in computing environments. In examples, an orchestrator connected to a computer system prepares a firmware payload with an updated firmware and an arm bundle indicating when and whether to activate the updated firmware. The firmware payload is then staged to the update agent as part of deployment process. The updated firmware is transmitted to the device, and an arm status is determined based on the arm bundle. The arm status is then transmitted to the root of trust, which aids in activating the staged firmware. The root of trust, upon receiving an activation command, reviews the arm status of the updated firmware. Based on the arm status, the root of trust then transmits a consume command to the device to consume the updated firmware.

20 Claims, 9 Drawing Sheets

STAGED ACTIVATION OF FIRMWARE IN A COMPUTING SYSTEM

BACKGROUND

Traditionally, the firmware of devices implemented in computing systems is updated by transitioning the workloads of a computer with the devices of a computing system and waiting for the installation of the firmware on the devices implemented. This firmware installation method often results in the computers in a computing system being unavailable for prolonged periods. This method of firmware installation often results in the nodes being collectively unavailable for prolonged periods or not resolving collective performance issues of nodes of a distributed computing system. Also, devices upon which the firmware is not successfully implemented may become unusable or unstable, and the computers, including the devices, may experience degraded performance until the firmware installation is resolved.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods for implementing a staged firmware activation system in a computing environment.

According to one or more embodiments of the present disclosure, a system for staging and arming firmware updates for activating later includes a device that can execute an updated firmware, an update agent to aid in staging the updated firmware, a root of trust coupled with the update agent to activate the updated firmware, an orchestrator connected to the update agent over a network to coordinate firmware updates on the device, at least one processor, and a memory coupled to the processor that consists of computer executable instructions when executed by the system to perform operations. The operations include preparing a firmware payload with the updated firmware and an arm bundle and staging the firmware payload to the update agent. Upon receiving the firmware payload, the update agent performs operations comprising transmitting the updated firmware in the firmware payload to the device, determining an arm status based on the arm bundle, and transmitting the arm status to the root of trust. The system may then transmit an activation command to the root of the trust, causing the root of trust to perform operations comprising reviewing the arm status of the updated firmware. If the arm status indicates that the updated firmware is armed for activation, a consume command is transmitted to the device to consume the updated firmware. After activating the updating firmware, the system copies the updated firmware to an active location for the device to automatically consume upon restarting. However, if the arm status is false, the system transmits a consume command to the device to consume firmware executed before receipt of the activation command.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following Figures.

DETAILED DESCRIPTION

Firmware refers to a form of software code or program embedded into hardware devices to facilitate the effective operation of the hardware devices. Computing systems with devices whose firmware needs to be updated are handled individually by updating the firmware on the device or storage associated with devices needing firmware updates. Firmware installation is time-consuming, and computer systems are unavailable for prolonged periods while installing the firmware on devices of the computer systems. Such situations cause the computers in a computing system to be unavailable for prolonged periods while the firmware is installed and activated to enable a device to access the installed firmware. By staging and activating firmware on devices of computers at different times, some computers may not be available simultaneously for a workload or may be unsuitable for running a workload due to different firmware versions on each computer. Additionally, a failure in installing firmware on some devices can cause other dependent devices (e.g., devices having a software dependency on another device) and computers housing the devices to be unavailable for running workloads. Still further, by handling firmware installation independently on each computing system/device, there is no way to handle installations and failures collectively. Furthermore, in a distributed computing system, the performance of networked computer nodes is based on the computer node with the slowest performance. Updating the performance-related firmware on the computer nodes individually to improve the performance of the distributed computing system may still perform poorly due to a slowest performing computer node.

In light of the above-described challenges with firmware installation, there is a need to separate deployment, installation, and activation of firmware. Also, it is preferable that the downtime caused by the firmware installation is minimized in order to ensure that all computer nodes of a distributed computing system are available simultaneously. Disclosed herein are systems that separate firmware staging (deployment and installation) and firmware arming for activation on a computing system. The disclosed system determines the firmware on the devices needing to be updated and sets arming flags to indicate the readiness of a device to activate the firmware for consumption by the device.

Figure 1:
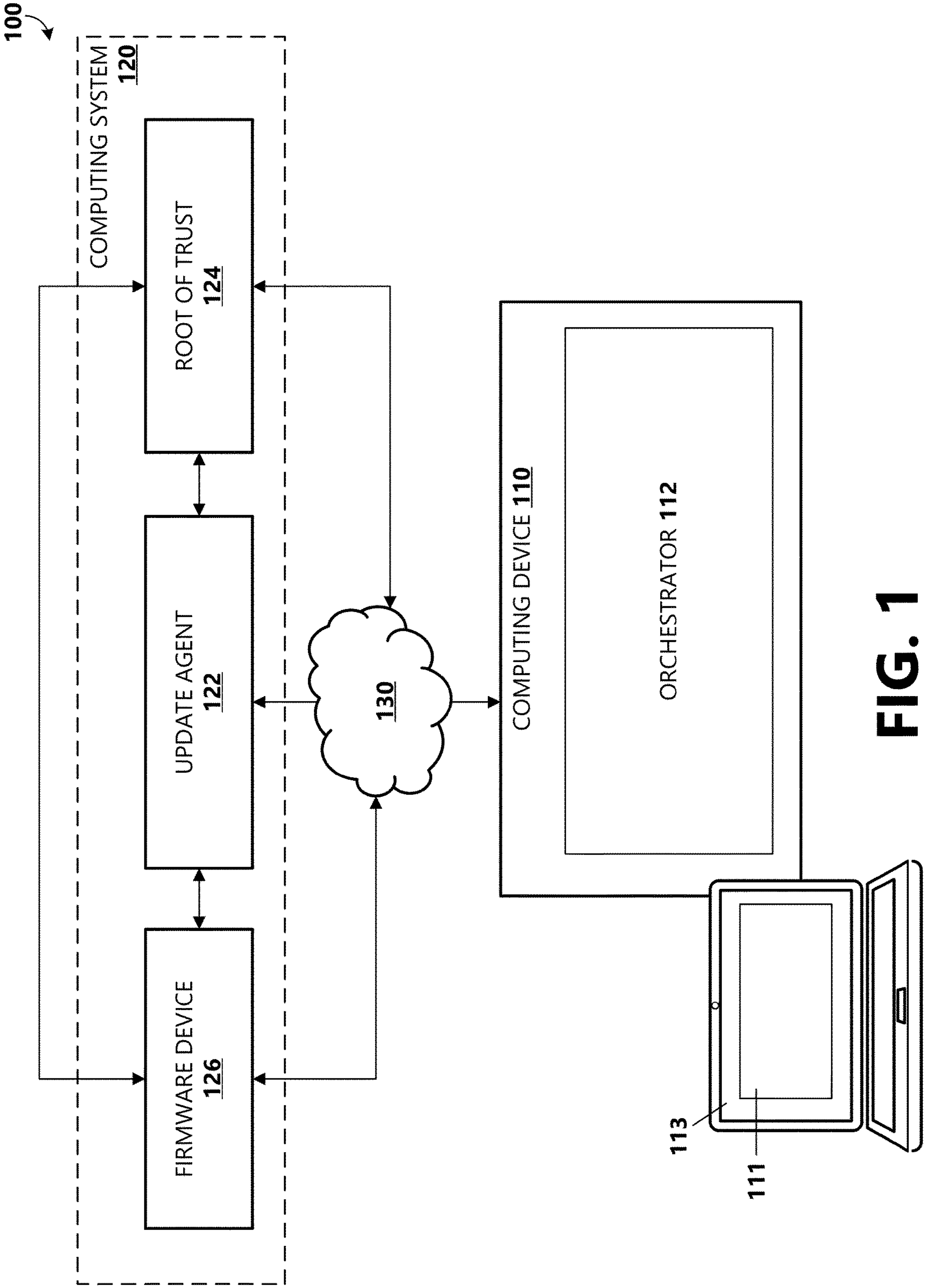
FIG. 1 illustrates a block diagram of an example system for staged firmware activation.
Figure 9:
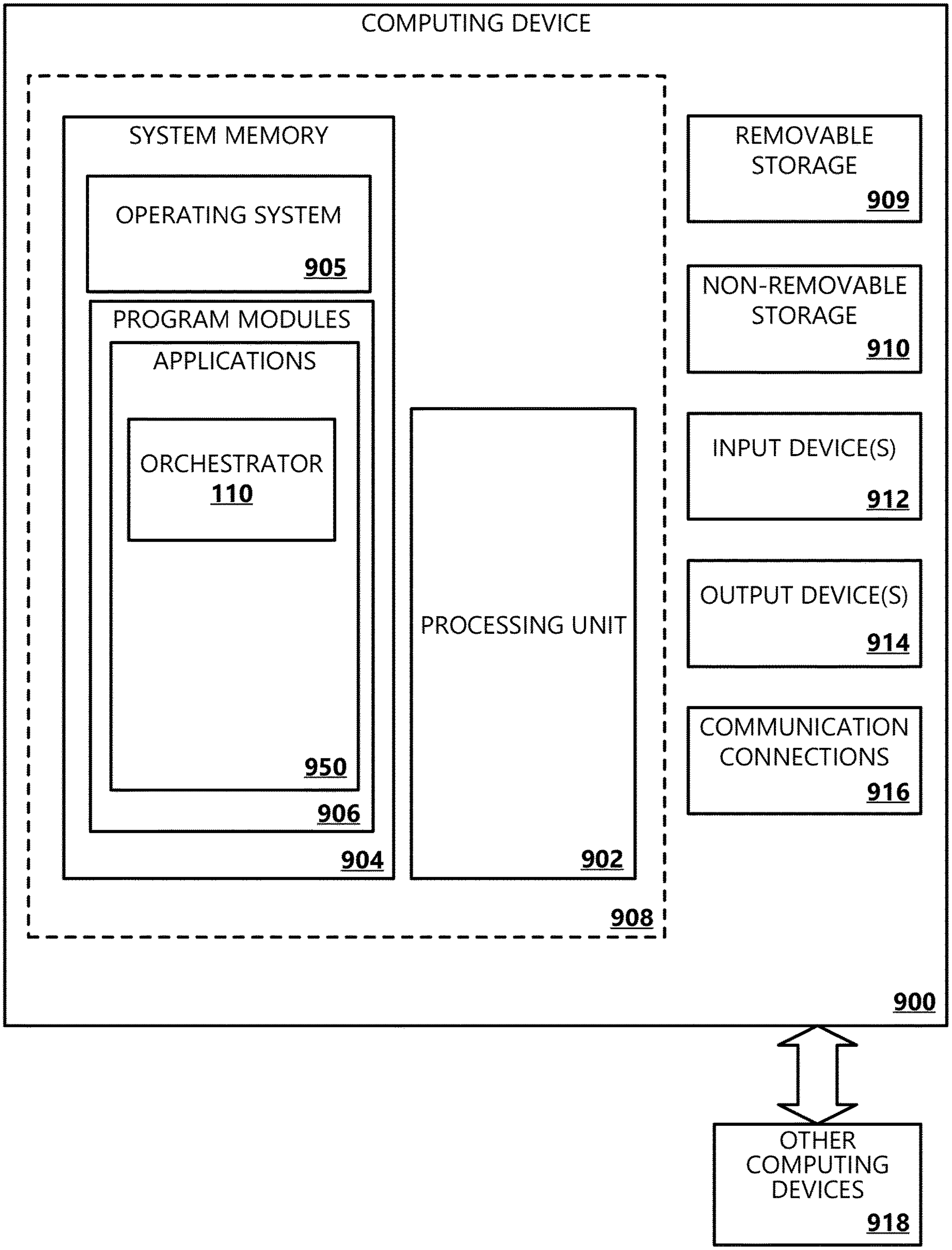
FIG. 9 is a block diagram illustrating an example of the physical components of a computing device for practicing aspects of the disclosure.

FIG. 1 is a block diagram of a staged firmware activation system 100, referred to hereinafter as system 100. The system 100, as depicted, is a combination of interdependent components that interact to form an integrated whole. Some components of system 100 are illustrative of software applications, systems, or modules that operate on a computing system or across a plurality of computing systems. Any suitable computer system(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 9. In another example, the components of systems disclosed herein are distributed across multiple processing devices.

In FIG. 1, system 100 comprises computing device 110, application UIs 111, orchestrator 112, display screen 113, computing system 120, update agent 122, Root of Trust (ROT) 124, firmware device 126, and network 130. Although system 100 is depicted as comprising a particular combination of computing devices and components, the scale and structure of devices and components described herein may vary and may include additional or fewer components than those described in FIG. 1. Further, although examples in FIG. 1 and subsequent figures will be described in the context of firmware updates and networks of computing systems/devices, the examples are equally applicable to other contexts. For instance, one or more of the examples are also applicable to other types of software updates or deployments and to centralized computing examples (e.g., computing environments in which the computers are in the same network).

As illustrated in FIG. 1, system 100 includes a computing device 110 to aid in updating the firmware of firmware device 126 with a new firmware version. Firmware device 126 may be implemented in a computing system 120 running a workload, which is typically a programmatic task or application. For example, a workload may be a mathematical calculation or a set of data processing steps. A workload running on a computing system 120 may be part of part of larger distributed workload running on multiple computing systems.

The firmware of firmware device 126 is updated by computing device 110 of system 100 using a two-step process: staging and activation of the firmware. In the first step, the firmware is staged by deploying the firmware to computing system 120. For example, computing device 110 deploys the firmware by uploading the firmware. The deployed firmware is then installed as part of the staging step. For example, computing system 110 installs the firmware by copying the received firmware to a storage location. In the second step, firmware is activated for consumption by the firmware device. System 100 may activate previously staged firmware by copying the firmware to a portion of a storage location accessible to the firmware and restarting the firmware device to access the firmware.

Computing system 120 may include computer nodes that are physically located together and/or networked together, such as in a rack within a data center (or another computing environment). In some examples, computing device 110 and computing system 120 are implemented in the same networked computing environment. In one such example, computing device 110 is one of the computer nodes in computing system 120 and is given the additional duty of managing the firmware update process on computing system 120. In other examples, computing device 110 and computing system 120 are implemented in separate computing environments and/or geographic locations that are accessible via network 130. Network 130 represents one or more networks (e.g., a private area network (PAN), a local area network (LAN), and a wide area network (WAN)).

Computing device 110 includes orchestrator 112. Orchestrator 112 prepares a payload to update device firmware on computing system 120. In the payload, orchestrator 112 includes firmware code and an arming bundle of instructions to arm firmware on devices (e.g., firmware device 126 of FIG. 1) in computing system 120. The firmware code may include a new or updated version of the firmware. Orchestrator 112 may receive firmware code from a user of computing device 110. Alternatively, orchestrator 112 may receive or retrieve the firmware code from a separate service, computing device, or computing system. For instance, the firmware code may be retrieved from a software code repository (not illustrated) accessible locally or remotely by orchestrator 112. In one instance, the firmware code is retrieved from the software code repository as part of a periodic check for software updates for computing system 120. Similar to the firmware code, the arming bundle may be received from a user of computing device 110 or a separate service, computing device, or computing system. The arming bundle represents an instruction indicting when and whether to activate firmware staged previously by the components of system 100 for use by firmware device 126. In some examples, the arming bundle includes Boolean values indicating "yes/no" for activating firmware on a device. In other examples, the arming bundle includes instructions in the form of conditions to activate firmware on a device. For instance, to activate firmware on a first device, the firmware must first be activated on a second device upon which the first device is dependent. Orchestrator 112 provides the payload to computing system 120 via network 130 to stage the firmware for activation.

Orchestrator 112 implements one or more application UIs 111, which may be presented via a display screen 113. Application UIs 111 provide functionality enabling a user request to, for example, update firmware on computing system 120, view results of updating firmware, or request rollbacks (e.g., reversions) to previous firmware versions. For example, application UIs 111 may enable a user to specify a storage location of firmware code to be used in a firmware update, specify the level within in a computing system 120 to target a firmware update (e.g., a specific set of devices within a computer node in computing system 120, all devices within in all computer nodes in a rack or data center, or a certain type of device of all computer nodes), specify one or more devices of computing system 120 to which the firmware update will be applied, specify an activation scenario (e.g., order of activating firmware on devices of computing system 120), specify a rollback scenario (e.g., the firmware update fails for a certain number or percentage of devices of computing system 120), or specify a remedial action (e.g., immediately revert all devices of computing system 120 to a previous firmware version, inactivate devices of computing system 120 that did not experience a successful firmware update, point network traffic for computing system 120 to an alternative cluster of computing system 120).

Computing system 120 may be a set of physical computer nodes connected over a high-speed network, such as network 130. In some examples, computing system 120 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

In some examples, the computer nodes of computing system 120 may have different computing and storage capabilities and may include different devices needing firmware updates. Computing system 120 may communicate with orchestrator 112 to receive firmware to update devices of each node in computing system 120. Computing system 120 may submit requests to orchestrator 112 for devices that need to be updated. Computing system 120 may submit a request at regular intervals for all devices. Orchestrator 112 may transmit a firmware payload when all nodes in computing system 120 have requested to update the firmware. These and other examples of computing system 120 behavior are described below in further detail with reference to FIGS. 2 and 3.

As illustrated in FIG. 1, computing system 120 includes update agent 122 and ROT 124, which collectively manage the staging and activation of firmware on firmware device 126.

Update agent 122 manages the firmware staging for firmware device 126 to consume (e.g., to be install with and use) the firmware. Update agent 122 can be a software or a hardware component that is included within a computer node comprising firmware device 126 or that is implemented external to the computer node. For example, update agent 122 is a driver software module managing the firmware updates on firmware device 126, such as a graphics card connected to a computer node. In another example, the update agent 122 is a hardware management controller such as a Basic Input Output System (BIOS) Management Controller (BMC) managing the firmware updates on a BIOS used to boot-up a computer node.

ROT 124 is a hardware, firmware, or a software component that is considered highly reliable and used to perform a specific task or store information in a secure environment. For example, ROT 124 is a hardware component with a signature to verify the authenticity of code in the BIOS before beginning the boot process. In another example, ROT 124 is a certification authority verifying the origin of a website accessed by a user over the internet. ROT 124 stores information in a secure manner and provides it when accessed by an application running on computing system 120. In some examples, ROT 124 processes the stored information prior to providing it to an application running on computing system 120.

ROT 124 ensures a successful update of firmware on firmware device 126 by performing security checks on the staged firmware and monitoring the health of firmware device 126 after consuming the staged firmware. Similar to update agent 122, ROT 124 may be associated with a specific firmware device or may manage the activation of the firmware of a set of devices of one or more computer nodes, such as in a rack, a data center, or a cloud network. In some examples, ROT 124 and update agent 122 are the same hardware or software module or different functions within the same software.

Firmware device 126 may be a device implemented in a computer node. Examples of firmware device 126 include BIOSs, disk drives, optical devices, graphics cards, sound cards, network cards, processing units (e.g., central processing units (CPUs), graphical processing units (GPUs), tensor processing units (TPUs)), motherboards, power management modules or devices, and security management modules or device. For example, computing system 120 may be a motherboard with multiple firmware devices 126 (e.g., processing units, microchips, and microcontrollers) that enable boot-up, communication, and other requirements to run an assigned workload. In at least one example, firmware devices 126 is a device implemented externally to the computer node. For instance, computing system 120 may be a rack of computer nodes and firmware device 126 may be a power management device or mechanism that is separately attached to the rack (e.g. separately from the computer nodes) or is in communication with the rack from a different location (e.g., a different rack, room, or geographic location).

Figure 2:
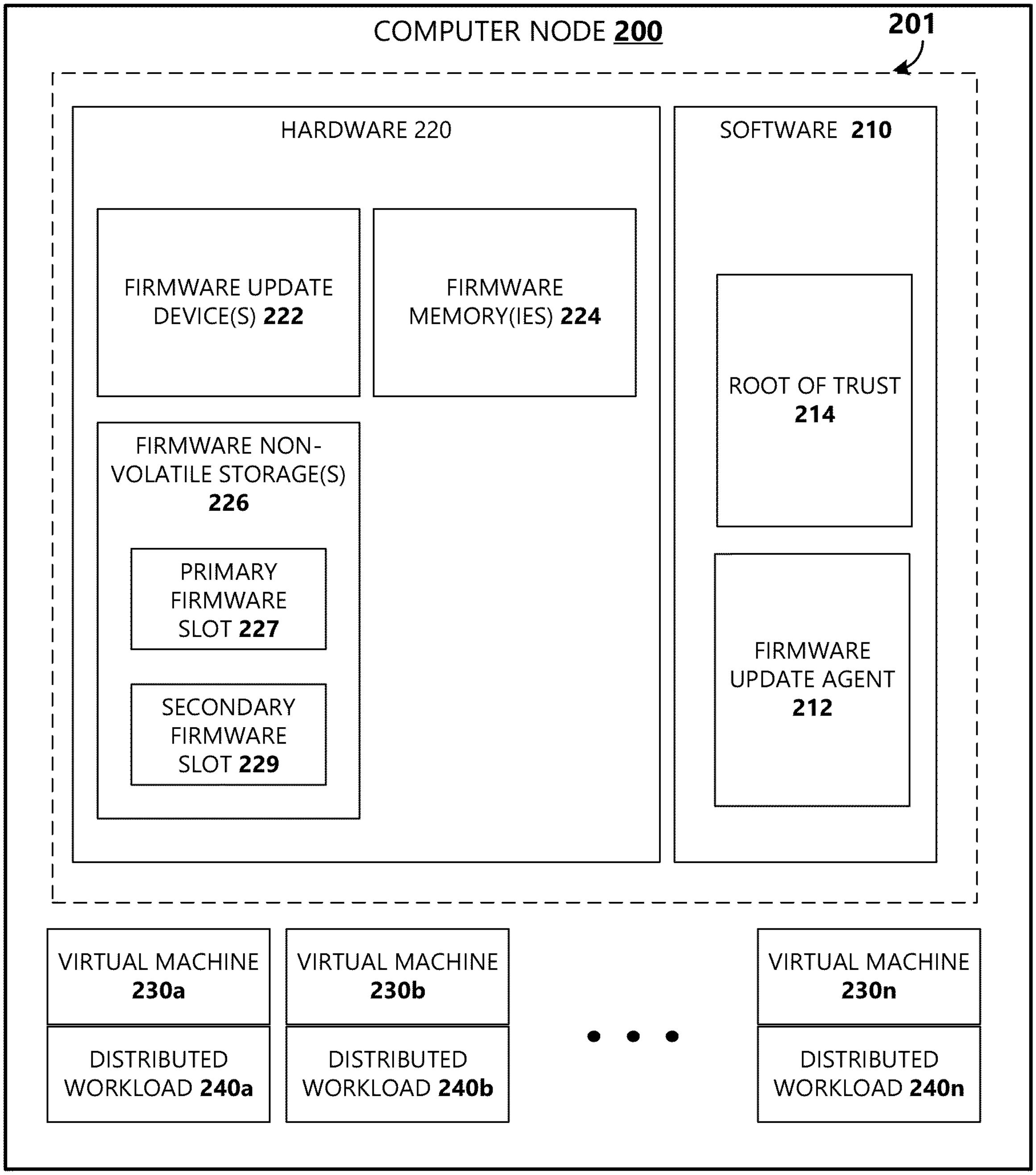
FIG. 2 is a block diagram of an example computer node with a device to receive updated firmware.

FIG. 2 is a block diagram of an example computer node 200 comprising devices to receive an updated version of the firmware. Computer node 200 may be part of a computing system 120 (as shown in FIG. 1). As illustrated in FIG. 2, computer node 200 includes system 201 and a set of virtual machines **230*a* to 230*n* running in computer node 200 using system 201. Virtual machines 230*a* to 230*n* may run multiple distributed workloads 240*a* to 240*n*. One or more distributed workloads of distributed computing loads 240*a* to 240*n* may run on virtual machines 230*a* to 230*n* at different times. System 201 includes software 210 and hardware 220**.

Software 210, which is used to update the firmware of devices included in hardware 220, includes firmware update agent 212 and Root of Trust (ROT) 214. In examples, firmware update agent 212 and ROT 214 are similar to (or the same as) update agent 122 and ROT 124, respectively, of FIG. 1. Components of software 210 may be dedicated hardware components, as described in FIG. 1. Firmware update agent 212 receives firmware payloads for updating the firmware consumed by firmware update device(s) 222.

Firmware update agent 212 communicates with orchestrator 112 (as shown in FIG. 1) to request and receive firmware updates and share the results of installing (or attempting to install) the updated firmware version on firmware update device(s) 222. Firmware update agent 212 parses the firmware payload received at computer node 200 over network 130 (as shown in FIG. 1) to extract the updated version of firmware and an arm bundle associated with the updated version of firmware. The arm bundle comprises arm statuses (e.g., flags, metadata, parameter values, or other indicators of whether a firmware version has been set to be installed) for the updated version of firmware, which determine when and whether to activate the updated version of firmware for consumption by firmware update device(s) 222. Firmware update agent 212 provides the arm bundle to ROT 214 and the updated version of firmware to hardware 220 for staging on firmware update device(s) 222. In some examples, firmware update agent 212 copies the updated firmware version to firmware non-volatile storage(s) 226 as part of staging the updated firmware version on firmware update device(s) 222. In other examples, firmware update agent 212 copies the updated firmware version to firmware memory(ies) 224 as part of staging the updated firmware version on firmware update device(s) 222. The updated firmware version may subsequently be copied to firmware non-volatile storage(s) 226 as part of the activation step.

Firmware update agent 212 monitors for new firmware payloads from orchestrator 112. In some examples, firmware update agent 212 includes a queue for storing received firmware update requests. The firmware update requests may be processed in the order each update request was received, or a different processing strategy may be used. The queue may include firmware updates to multiple devices of firmware update device(s) 222. In some examples, firmware update agent 212 updates the firmware of multiple devices simultaneously. A further description of firmware updates to multiple devices is described in detail in the FIG. 3 description below.

ROT 214 activates an updated version of the firmware for consumption by firmware update device(s) 222 upon confirmation that the firmware update device(s) 222 is armed (e.g., an arm status is set to true) for activation. Upon receiving an activation command, ROT 214 communicates with firmware update device(s) 222 to activate the updated version of the firmware. In some examples, ROT 214 receives the activation command from an external source, such as orchestrator 112 (as shown in FIG. 1). In other examples, ROT 214 receives the activation command from an internal source, such as a component of (or implemented within the same computing environment as) computer node 200. In such examples, the activation command may be received in response to a restart of firmware update device(s) 222 or computer node 200 itself. For example, in response to a power failure or software crash that causes computer node 200 to restart, firmware update device(s) 222 may be started or restarted. As part of starting firmware update device(s) 222, ROT 214 receives an activation request to activate the firmware of firmware update device(s) 222. As part of the activation process, the ROT 214 evaluates whether an updated version of the firmware has been armed (e.g., evaluates the arm status for the updated version of the firmware), which prevents the accidental activation of staged firmware due to an unexpected stability impacting event.

ROT 214 may activate or cause components of hardware 220 to activate installed firmware updates on firmware update device(s) 222. ROT 214, upon confirming the arm status of firmware update device(s) 222, restarts firmware update device(s) 222 to consume the updated version of the firmware. As part of activating the updated version of the firmware, ROT 214 monitors the health of firmware update device(s) 222 during and/or subsequent to the boot-up phase to confirm successful activation. ROT 214 may also store the updated firmware version in an active storage location (e.g., primary firmware slot 227 of FIG. 2). In subsequent restarts of firmware update device(s) 222, the firmware stored in the active storage location (e.g., the updated version of the firmware of FIG. 2) is used to boot firmware update device(s) 222. In some examples, storing the updated firmware version in an active storage location comprises copying the updated firmware version from a temporary location (e.g., secondary firmware slot 229 of FIG. 2) to an active storage location. In other examples, storing the updated firmware version in an active storage location comprises copying the updated firmware version from firmware memory(ies) 224 to firmware non-volatile storage(s) 226. A description of steps for activating firmware is described in detail in the FIG. 3 description below.

As illustrated in FIG. 2, hardware 220 includes firmware update device(s) 222, firmware memory(ies) 224, and firmware non-volatile storage(s) 226. Firmware update device(s) 222 may represent a variety of firmware devices used by computer node 200. For example, one firmware device in firmware update device(s) 222 may be a BIOS device that is used to boot-up and load software of computer node 200. Other devices of firmware update device(s) 222 can include devices including or associated with graphics cards and other hardware of computer node 200.

Firmware memory(ies) 224 is a volatile memory, such as Random Access Memory (RAM) used by a software or a firmware device while executing code. Firmware update device(s) 222 may use firmware memory(ies) 224 as a temporary storage location to cache firmware code and data generated when executing the firmware code. The contents of firmware memory(ies)224 are erased upon restart of firmware update device(s) 222. In some examples, firmware memory(ies) 224 may be erased after firmware update device(s) 222 completes the execution of a requested function. In other examples, firmware memory(ies) 224 may be erased based on other triggers such as a set timeout period during which firmware memory(ies) 224 was not accessed by firmware update device(s) 222.

Firmware non-volatile storage(s) 226 includes storage location whose contents do not change between multiple uses of firmware update device(s) 222, including restart of firmware update device(s) 222. For example, firmware non-volatile storage(s) 226 is a Read Only Memory (ROM) which is flashed with content (e.g., code and data) and is not erased until explicitly flashed with updated content. As illustrated in FIG. 2, firmware non-volatile storage(s) 226 may be partitioned into two or more partition portions. For example, a first partition portion may be created to store the current version of the firmware (e.g., the currently activated version) and a second partition portion may be created to store the updated version of the firmware (e.g., the to-be activated version). In examples, firmware update agent 212 copies the updated version of firmware to secondary firmware slot 229 (e.g., the second partition portion) as part of staging the updated version of firmware. Primary firmware slot 227 (e.g., the first partition portion) may include the current version of firmware consumed by the firmware update device(s) 222. In some examples, upon determining that the arm status associated with firmware update device(s) 222 is true for the updated version of the firmware, ROT 214 may request to copy the updated version of firmware in secondary firmware slot 229 to primary firmware slot 227. Copying the updated version of firmware to primary firmware slot 227 results in the activation of the updated version of firmware for consumption by firmware update device(s) 222. In some examples, copying the updated version of firmware to primary firmware slot 227 also causes the current version of firmware in primary firmware slot 227 to be copied to the secondary firmware slot 229. In examples, firmware non-volatile storage(s) 226 includes multiple partitions that each store a different version of firmware consumed in the past and/or staged and scheduled for consumption in the future.

Figure 3:
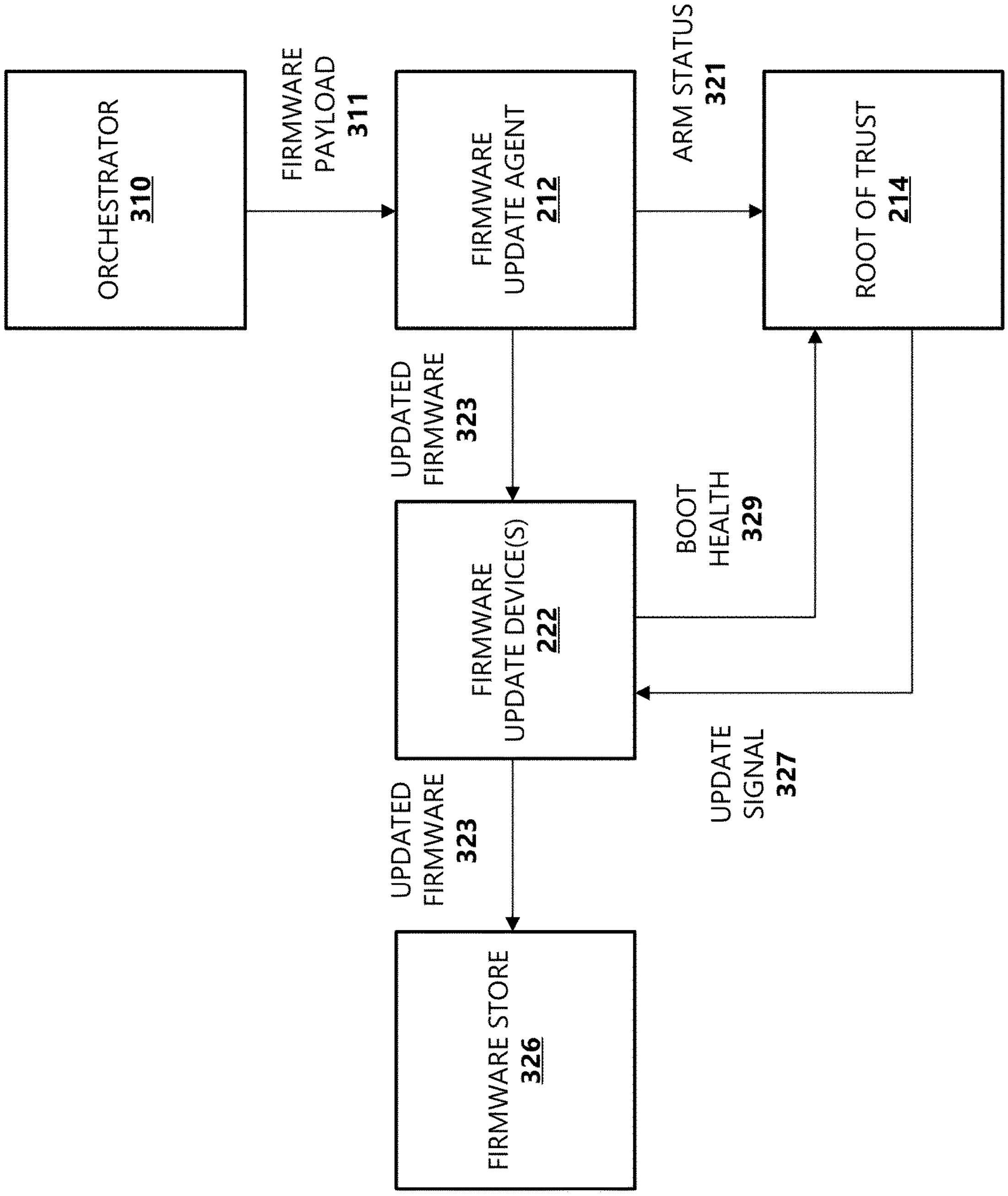
FIG. 3 is a flow diagram of the interaction between the center orchestrator and components of the computer node of FIG. 2.

FIG. 3 is a flow diagram of the interaction between an orchestrator, such as orchestrator 112 of FIG. 1, and the components of a computer node, such as the components of the computer node 200 of FIG. 2. Orchestrator 112 begins the process of updating the firmware of devices (e.g., firmware update device(s) 222 of FIG. 2) in a computer node (e.g., computer node 200 of FIG. 2) by transmitting firmware payload 311 to firmware update agent 212. Firmware payload 311 contains updated firmware 323 for one or more of the devices of the computer node and arm status 321 for updated firmware. Arm status 321 indicates when and whether to activate updated firmware 323 on the devices of the computer node.

In some examples, firmware payload 311 may include updated firmware 323 for multiple firmware update device(s) 222 on the computer node. Firmware update agent 212 may determine the updated firmware 323 corresponding to each firmware update device(s) 222 based on information in an update request, text in the firmware code, information in an update schedule, or any other means of deriving the identity of corresponding devices. In other examples, firmware payload 311 indicates the corresponding firmware update device(s) 222 for each updated version of firmware. For instance, firmware payload 311 may include firmware code sections that are delineated by device name or are otherwise tagged with device identifying information.

In other examples, firmware payload 311 may include a target level for update firmware 323. The target level identifies the level in the computing environment, such as computing system 120 (as shown in FIG. 1), to stage updated firmware 323 in firmware payload 311. A level indicates the position within a hierarchical arrangement of connected computers. For example, a rack target level stages updated firmware 323 on all devices of all computer nodes within a specified rack. In another example, a platform target level stages updated firmware 323 on all devices associated with processing units (e.g., CPUs, GPUs, TPUs) of a platform. A platform refers to the hardware and/or software components that constitute a computing environment in which software can be executed. A further description of different target levels is described in detail in descriptions of FIGS. 4-5 below.

Firmware update agent 212 receives and parses firmware payload 311 to identify arm status 321 and updated firmware 323. Firmware update agent 212 transmits arm status 321 to ROT 214 and transmits updated firmware 323 to firmware update device(s) 222.

Firmware update agent 212 may sequentially update each firmware update device(s) 222 with the corresponding updated version of firmware. For instance, each updated firmware 323 may be associated with a separate arm status 321 (e.g., the arm statuses 321 of FIG. 3 are each associated with different instructions and conditions to activate updated firmware 323), or each updated firmware 323 may be contingent on the occurrence of an event (e.g., the successful installation of a software dependency of updated firmware 323). Alternatively, firmware update agent 212 may update firmware update device(s) 222 simultaneously or while other firmware updates are ongoing. For instance, each updated firmware 323 may be associated with the same arm status 321 or with an arm status 321 that is dependent on the arm status 321 of a different firmware update device(s) 222. In some examples, prior to updating firmware update device(s) 222, firmware update agent 212 performs one or more preprocessing steps on updated firmware 323. The preprocessing steps may include modifying the data values, data types, data structures, or other content of updated firmware 323 to conform to a data schema or format expected by firmware update device(s) 222.

Firmware update device(s) 222 or firmware update agent 320 transmits updated firmware 323 to firmware store 326. Firmware store 326 is a data store that stores firmware and/or other software associated with the computer node. For instance, firmware store 326 may represent volatile or non-volatile memory (e.g., firmware memory(ies) 224 or firmware non-volatile storage(s) 226 of FIG. 2) that stores current and/or previous versions of firmware for firmware update device(s) 222. In examples, firmware store 326 may be accessible locally to the computer node (e.g., implemented within the computer node) or accessible remotely by the computer node (e.g., implemented by another device or system that is accessible to the computer node via a network). Updated firmware 323 may be transmitted to firmware store 326 prior to or subsequent to updated firmware 323 being installed on firmware update device(s) 222.

ROT 214 reviews the arm status 321 associated with updated firmware 323 to confirm the conditions for activating previously staged firmware (e.g., updated firmware 323 of FIG. 3) are satisfied. ROT 214 also monitors for activation commands to review arm status 321. When the arm status 321 confirms that updated firmware 323 is to be activated, ROT 214 sends update signal 327 to firmware update device(s) 222 to activate and consume updated firmware 323. In examples, update signal 327 may be a restart command transmitted to firmware update device(s) 222. After transmitting update signal 327 to firmware update device(s) 222, ROT 214 monitors the boot-up process for firmware update device(s) 222. ROT 214 may review boot health 329 of firmware update device(s) 222 at every step of the boot-up process to determine if ROT 214 is to issue a rollback command. In some examples, ROT 214 determines the status of the boot-up process by determining boot health 329 is not available. For example, if boot health 329 (or a portion of boot health 329) is not transmitted by firmware update device(s) 222 for a step of the boot-up process within a specified time period, ROT 214 determines that a firmware update failure has occurred and transmits a rollback command to firmware update device(s) 222. In examples, ROT 214 transmits a rollback command as another update signal 327 to firmware update device(s) 222 to activate a previous version of the firmware prior to restarting firmware update device(s) 222. In some examples, upon the successful completion of the boot-up process by firmware update device(s) 222, ROT 214 copies updated firmware 323 to firmware store 326. For instance, updated firmware 323 may be copied to a first portion of firmware store 326 that stores the currently activated firmware (and/or firmware to be activated) for firmware update device(s) 222. As part of copying the updated firmware 323 to the first portion of firmware store 326, a previous version of firmware for firmware update device(s) 222 may be copied to a second portion of firmware store 326 that stores one or more previous versions of firmware for update device(s) 222.

Figure 4:
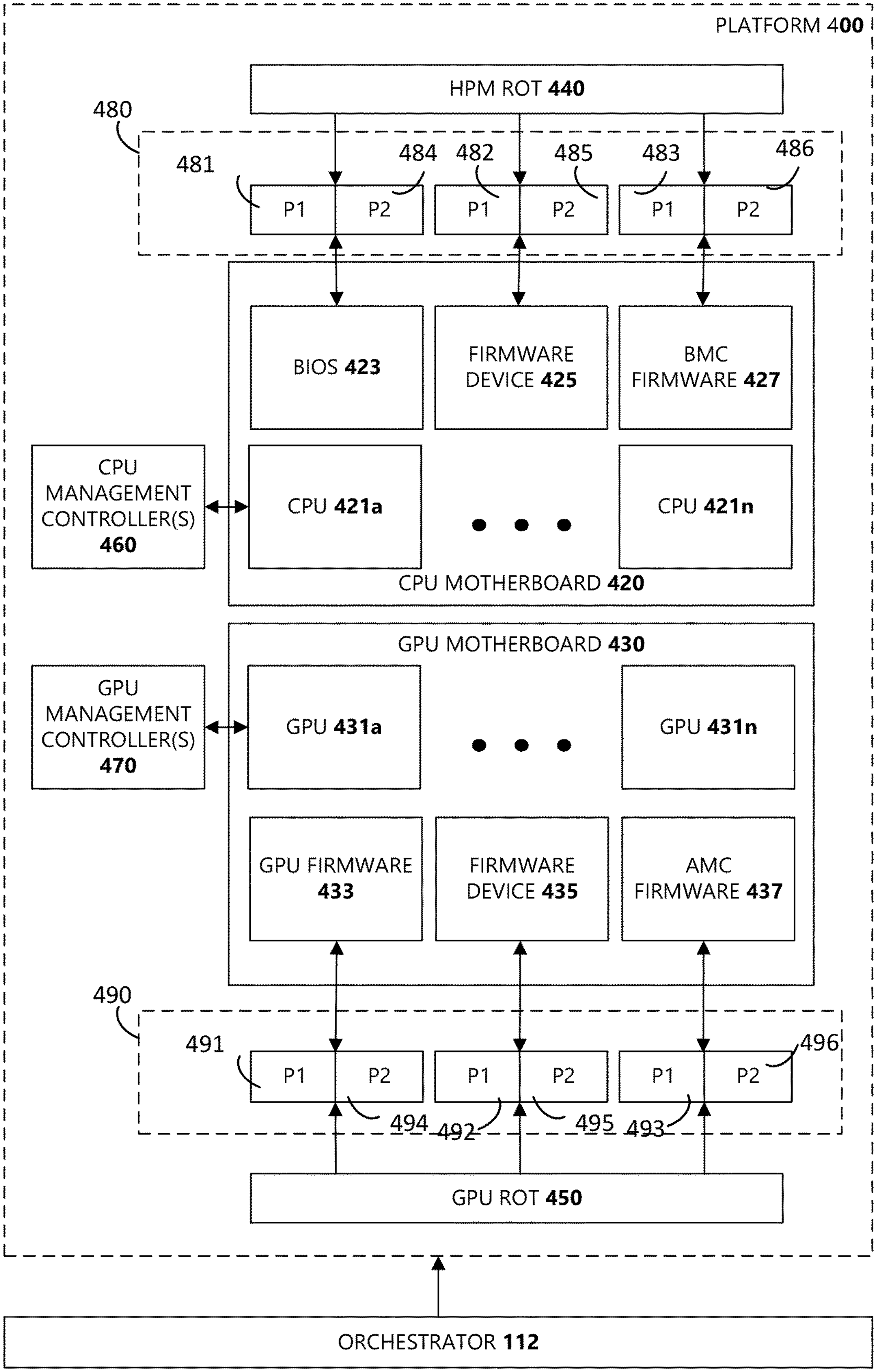
FIG. 4 is a block diagram of an example platform with devices to receive updated firmware.

FIG. 4 is a block diagram of an example platform 400 comprising devices to receive updated firmware. Platform 400 includes multiple processing units in the form of CPUs 421*a-n* and GPUs 431*a-n* that may include devices using firmware. CPUs 421*a-n* that are implemented on CPU motherboard 420 and GPUs 431*a-n* that are implemented on GPU motherboard 430.

Devices of platform 400 are used in collaboration with CPUs 421*a-n* and GPUs 431*a-n* to run workloads (e.g., distributed workloads 240*a* to 240*n* of FIG. 2). Devices of platform 400 may be specific to a single processing unit or shared across multiple processing units. As illustrated in FIG. 4, CPU motherboard 420 may include additional devices using firmware, such as BIOS 423 and firmware device 425. Similarly, GPU motherboard 430 may include devices using firmware, such as GPU firmware device 433 and firmware device 435.

Platform 400 includes multiple management controllers acting as ROTs and update agents to manage firmware and firmware updates on the various devices of platform 400. In FIG. 4, host power management (HPM) ROT 440 is a management controller (e.g., a hardware device or a software program) that acts as an ROT for managing the activation of firmware for BIOS 423, firmware device 425, and/or other devices of CPU motherboard 420. CPU management controller(s) 460 and GPU management controller(s) 470 may act as an ROT for managing firmware on devices of CPUs 421*a-n* and GPUs 431*a-n*, respectively. In examples, BIOS Management Controller (BMC) 427 and Advanced Multi-Accelerator Controller (AMC) 437 act as update agents that stage firmware on BIOS 423 and Firmware device 425, respectively. In examples, update agents can themselves be devices whose firmware is managed by other update agents. For example, BMC firmware 427 and AMC firmware 437 may consume firmware managed by an update agent (not illustrated) common to CPU motherboard 420 and GPU mother motherboard 430. Alternately, in another example, HPM ROT 440 and GPU ROT 450 can stage and activate firmware on BMC firmware 427 and AMC firmware 437, respectively.

In examples, one or more ROTs of platform 400 (e.g., HPM ROT 440, GPU ROT 450, CPU management controller(s) 460, GPU management controller(s) 470 of FIG. 4) may operate at different hierarchy levels. For instance, an orchestrator 112 is in communication with platform 400 may identify the appropriate level of management controllers to use to stage firmware on firmware devices. Orchestrator 112 may also identify the appropriate level of ROT to use to activate firmware on firmware devices. In some examples, orchestrator 112 identifies the management controller and/or ROT to be used based on the type of update firmware transmitted to platform 400. For example, orchestrator 112 may determine that update firmware includes an updated version of firmware for a BIOS. Based on that determination, the orchestrator identifies that BMC firmware 427 is to be used to stage the update firmware on BIOS 423.

Platform 400 also includes multiple storage locations for storing firmware updates. In examples, a storage location is partitioned into at least a first partition portion for storing a current (e.g., activated) version of firmware and a second partition portion for storing previous versions of firmware. For example, storage location 480 includes first partitions 481-483 and second partitions 484-486, and storage location 490 includes first partitions 491-493 and second partitions 494-496. BMC firmware 427 may stage firmware of BIOS 423 and firmware device 425 in one or more of second partitions 484-486. Upon activation of the firmware, HPM ROT 440 moves the firmware from second partitions 484-486 to one or more of first partitions 481-483. Similarly, AMC Firmware 437 may stage firmware of firmware device 435 in one or more of second partitions 494-496. Upon activation of the firmware, GPU ROT 450 moves the firmware from second partitions 494-496 to one or more of first partitions 491-493.

Orchestrator 112 may interact with various components of platform 400 to stage and activate firmware on devices of platform 400. Orchestrator 112 may target a particular update agent and ROT to stage and activate firmware across multiple devices. In examples, orchestrator 112 requests that firmware staged by multiple update agents be activated at different times by one or more of update agents. For example, orchestrator 112 requests activation of firmware staged using BMC firmware 427 and CPU management controller(s) 460 by transmitting an activation command to HPM ROT 440. In another example, orchestrator 112 requests that firmware staged using GPU management controller(s) 470 be activated at different times in devices associated with GPUs 431*a-n* by transmitting an activation command to GPU ROT 450.

Figure 5:
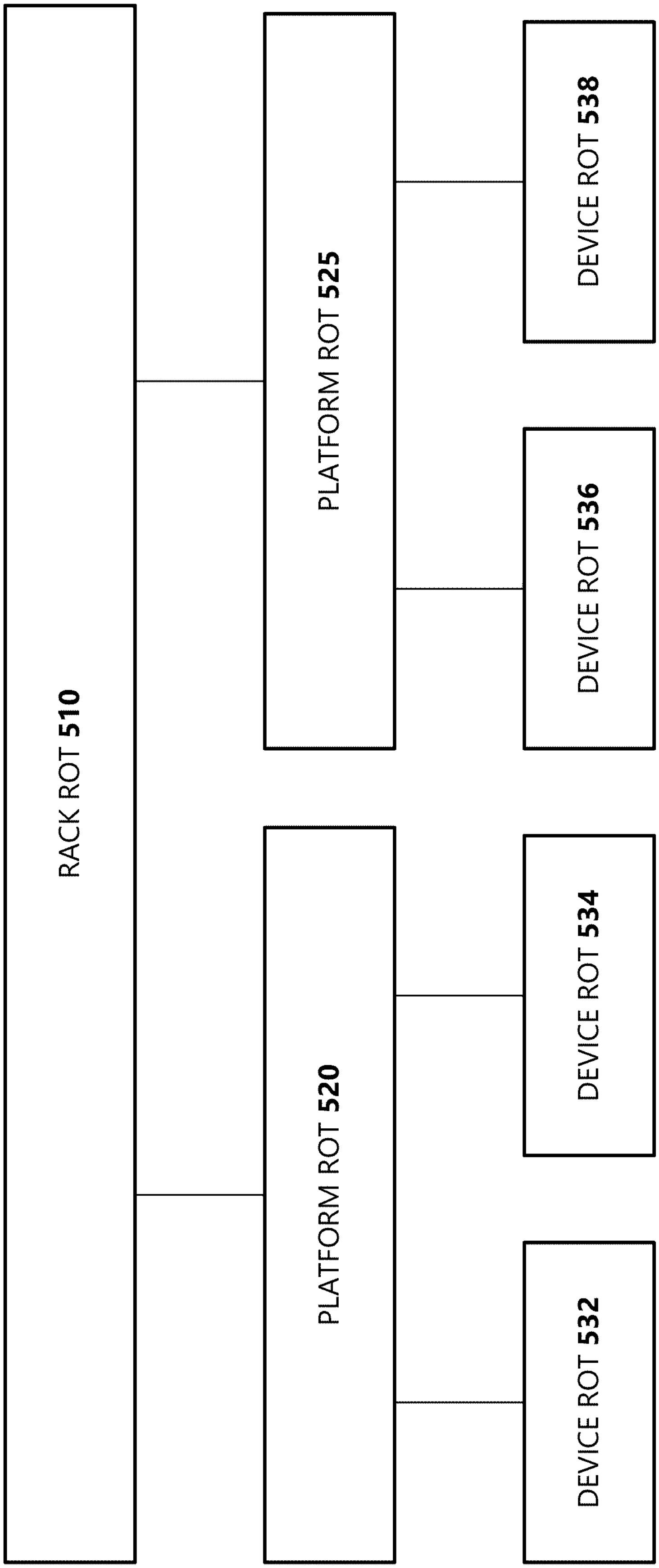
FIG. 5 illustrates a multi-level root of trusts to activate staged firmware on devices.

FIG. 5 illustrates a multi-level ROT to activate staged firmware on devices. As illustrated in FIG. 5, an example firmware staging system may have ROTs at a rack level (e.g., the rack ROT 510), a platform level (e.g., the platform ROT 520 and 525 of FIG. 5), and a device level (e.g., device ROT 532, 534, 536, and 538 of FIG. 5). A set of devices is activated with an updated version of firmware based on the level of the ROT targeted with an activation command and a global arm status. When an ROT at a certain level receives an activation command, the ROT determines the existence of a global arm status for the updated version of firmware. If a global arm status provided to a targeted ROT indicates that the updated version of firmware is not armed for activation (e.g., a flag or other indicator of the global arm status is missing or is set to false), the staged firmware activation task may be passed to a ROT of a lower level. For example, upon determining that the global arm status associated with a received activation request indicates that an updated version of firmware is not armed for activation, rack ROT 510 passes the firmware activation task to platform ROT 520 and/or 525. Similarly, if global arm status is absent or set to false in either platform ROT 520 or 525, the activation task is passed to device level ROT linked in a hierarchical manner to platforms ROT 520 and 525.

A root of trust may not review the arm statuses at lower levels if it includes a set global arm status. For example, rack ROT 510 will not check the arm status at each device if the global arm status is set to true.

Having described a system that may be employed by the aspects disclosed herein, this disclosure will now describe methods that may be performed by various aspects of the disclosure. In aspects, methods 600-800 may be executed by a system, such as system 100 of FIG. 1. However, methods 600-800 are not limited to such examples.

Figure 6:
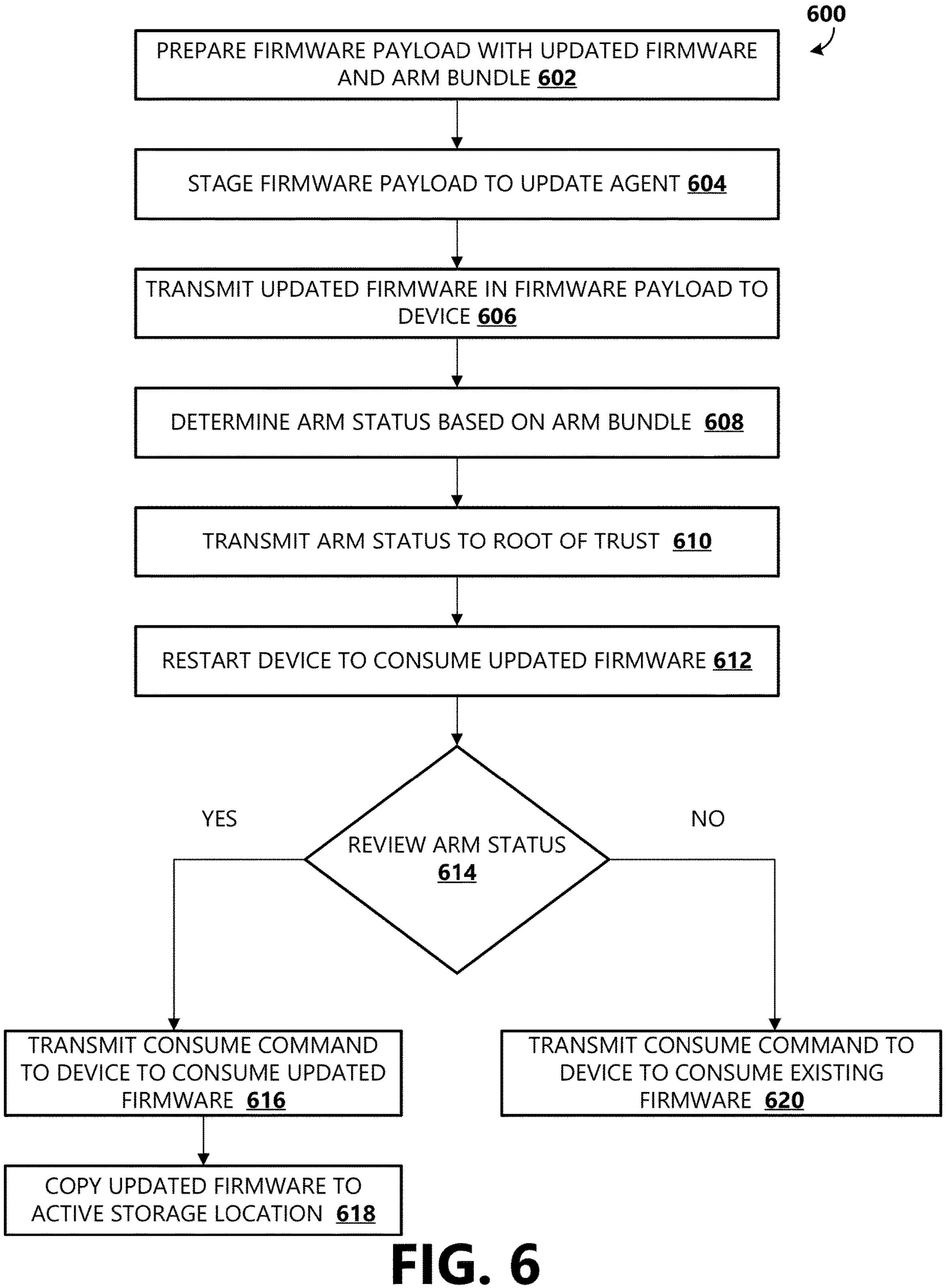
FIG. 6 depicts an example method for staging firmware and arming on a computing system.

FIG. 6 depicts an example method for staging firmware and arming on a computing system.

At operation 602, a firmware payload (e.g., firmware payload 311 of FIG. 3) for updating the firmware of a firmware device (e.g., firmware update device(s) 222 of FIG. 2) is prepared. For instance, an orchestration component (e.g., orchestrator 112 of FIG. 1) may prepare a firmware payload for transmission to a computer system (e.g., computing system 120 of FIG. 1) comprising the firmware device and one or more other devices. In examples, the firmware payload includes an updated version of firmware (e.g., updated firmware 323 of FIG. 3) for a device and an arming bundle with arm statuses (e.g., arm status 321 of FIG. 3) identifying the conditions to activate the updated version of firmware. Alternatively, the updated version of firmware may be provided in a first payload that is transmitted at a first time and the arming bundle may be provided in a second payload that is transmitted at a second time. In some examples, the arming bundle is received from a user of a computing device (e.g., computing device 110 of FIG. 1). For instance, the orchestration component may provide an interface (e.g., application UI 111 of FIG. 1) that enables a user to provide the arm bundle with instructions and conditions to activate staged firmware via a display (e.g., display screen 113 of FIG. 1) of the computing device. The orchestration component then includes the arming bundle in the firmware payload.

In other examples, the orchestration component determines the arming bundle based on the location of the firmware devices of the computing system and/or connections between firmware devices and the computer containing the firmware devices. For example, in platform 400 (as shown in FIG. 4), when the firmware of both BIOS 423 (as shown in FIG. 4) and firmware device 425 (as shown in FIG. 4) need to be updated, the orchestration component transmits an arming bundle with a global arm status, as the location of BIOS 423 and firmware device 425 on CPU motherboard 420 causes their firmware is activated by HPM ROT 440 (as shown in FIG. 4) sitting at the top of the hierarchy of ROTs. In another example, when the firmware of only BIOS 423 needs to be activated, the arm bundle includes arm status for BIOS 423 as its firmware is activated by HPM ROT 440, which also can activate the firmware of firmware device 423. For example, based on the target level described in FIG. 5, the number of devices to be staged and activated is determined. Accordingly, the number of arm statuses to include in the arming bundle.

At operation 604, the orchestration component stages firmware by transferring the firmware payload to a firmware agent (e.g., update agent 122 of FIG. 1) of the computing system. The firmware agent parses the firmware payload to identify the updated version of firmware and the arming bundle. The updated version of firmware is stored in a storage location associated with each firmware device (e.g., firmware non-volatile storage(s) 226 of FIG. 2). In examples, the storage location is partitioned into at least a first partition portion that stores the current version(s) of the firmware (e.g., primary firmware slot 227) and a second partition portion that stores the updated version(s) of firmware (e.g., secondary firmware slot 229 of FIG. 2).

At operation 606, the staged firmware is transmitted to the firmware device of the computing system. For example, the firmware agent retrieves the storage location and installs the staged firmware (or causes the firmware to be installed) on the firmware device. If the staged firmware represents new firmware of the firmware device (e.g., a previous version of the firmware is not currently installed or activated on the firmware device), one or more new files and/or directories may be created in a file system of the device to store content of the firmware. However, if the staged firmware represents an updated version of firmware of the firmware device, one or more files and/or directories associated with a previous version of the firmware may be updated or overwritten using content of the staged firmware.

At operation 608, the arm status associated with the firmware device is determined from the arming bundle in the firmware payload. For example, the update agent may evaluate the content of the arming bundle to determine the arm status associated with the firmware device. The arm status may identify the conditions for activating the updated version of firmware on the firmware device. In some examples, the arming bundle includes arm statuses of various devices of the computing system. For instance, the arming bundle may include arm statuses for other devices that are the same as the firmware device (e.g., a same make, model, or type) and for other devices that are different from the firmware device (e.g., a different make, model, or type). The other devices may be implemented in the same computer node as the firmware device or in a separate computer node from the firmware device.

At operation 610, the arm status for the firmware is provided to an ROT of the computing system (e.g., ROT 124 of FIG. 1). The ROT monitors the computing system and/or events related to the computing system to determine whether the arm status (e.g., conditions for activating the firmware on the firmware device) has been satisfied. As one example, the ROT may include an event listener mechanism for detecting when particular predefined events have occurred. Such events may include the occurrence of a date/time, the lapse of an amount of time, the successful activation of a dependent component (e.g., application, service, firmware device), the restart of the firmware device, or the receipt of an internal or external activation request. For example, the firmware device receives an external activation request due to unwarranted/accidental reset like a power loss, restart of computer node including firmware device after a crash, firmware device reset to address a tear down of a virtual machine running on a computer node. The ROT may also be provided with an indication of one or more devices associated with the arm status (e.g., devices to which the firmware update will be applied).

At operation 612, a firmware device (e.g., firmware device 126 of FIG. 1) is requested to restart in order to consume an updated version of firmware (e.g., the updated firmware 323 of FIG. 3) on the firmware device. In examples, a device restarts upon receiving updated firmware uploaded in operation 606. In other examples, an ROT (e.g., ROT 124 of FIG. 1) transmits a restart command to the firmware device. In some other examples, a computing device (e.g., computing system 120 of FIG. 1) containing the firmware device or associated with the firmware device may be restarted to restart the firmware device. A firmware device, upon receiving a restart command, may request an ROT to aid in determining whether to consume an updated firmware.

At operation 614, the ROT determines whether the arm status indicates that the firmware is armed for activation on the firmware device. In examples, the ROT makes this determination based on a receiving a restart command to restart the firmware device. The restart command may be received in response to the unexpected failure of the firmware device (e.g., a power failure or software crash), a user request for restart the firmware device, or as part of a defined maintenance schedule (e.g., a nightly restart). After receiving the restart command, the ROT uses one or more techniques (e.g., pattern matching) to determine whether the arm status includes an indicator (e.g., a flag, metadata, a parameter value) that the firmware is armed for activation. If it is determined that the arm status indicates that the firmware is armed for activation, then method 600 proceeds to operation 616. However, if it is determined that the arm status indicates that the firmware is not armed for activation, then method 600 proceeds to operation 620.

At operation 616, the ROT activates the staged firmware that has been installed on the firmware device in operation 604. In some examples, the ROT simultaneously (or near simultaneously) activates the firmware for one or more firmware devices of the computer system and/or firmware devices of other computer systems. In other examples, the ROT activates the firmware for one or more firmware devices in an asynchronous manner or in a manner in which a firmware device is activated while another firmware device is currently activating. In examples, the staged firmware is activated by changing the pointer (e.g., an object storing a memory address) of a previous version of the firmware to point to the storage location of the updated version of firmware. By changing the pointer to the location of the updated version of firmware, the previous version of firmware may be reinstalled to a device quickly and simply in the event that a firmware upgrade is unsuccessful. For instance, instead of being required to redeploy the previous version of firmware to the computing system, as would be required if the previous version of firmware had been deleted from the computing system, the previous version of firmware can be reactivated by changing the pointer to point to the storage location of the previous version of the firmware code. In some examples, in response to an unsuccessful firmware activation of a firmware device, one or more of the firmware devices of the computer system continues to use the previous version of the firmware.

At operation 618, the ROT transmits a copy command to the firmware device to copy the updated version of the firmware to an active storage location. In response to the copy command, the firmware device copies the firmware to the active storage location. In examples, the firmware stored in the active storage location is used by the firmware device when the firmware device is restarted. For instance, the currently activated firmware for one or more devices of the computer system may be stored in the active storage location and previous versions of firmware may be stored in a separate storage location of the computer system or removed from the computer system. A further description of copying firmware to a storage location is described in FIG. 7 description below.

At operation 620, the ROT may transmit a consume command to the firmware device to consume firmware that existed before staging the updated version of the firmware. The root of trust may transmit the existing firmware version to the device to select the appropriate version of the firmware.

Figure 7:
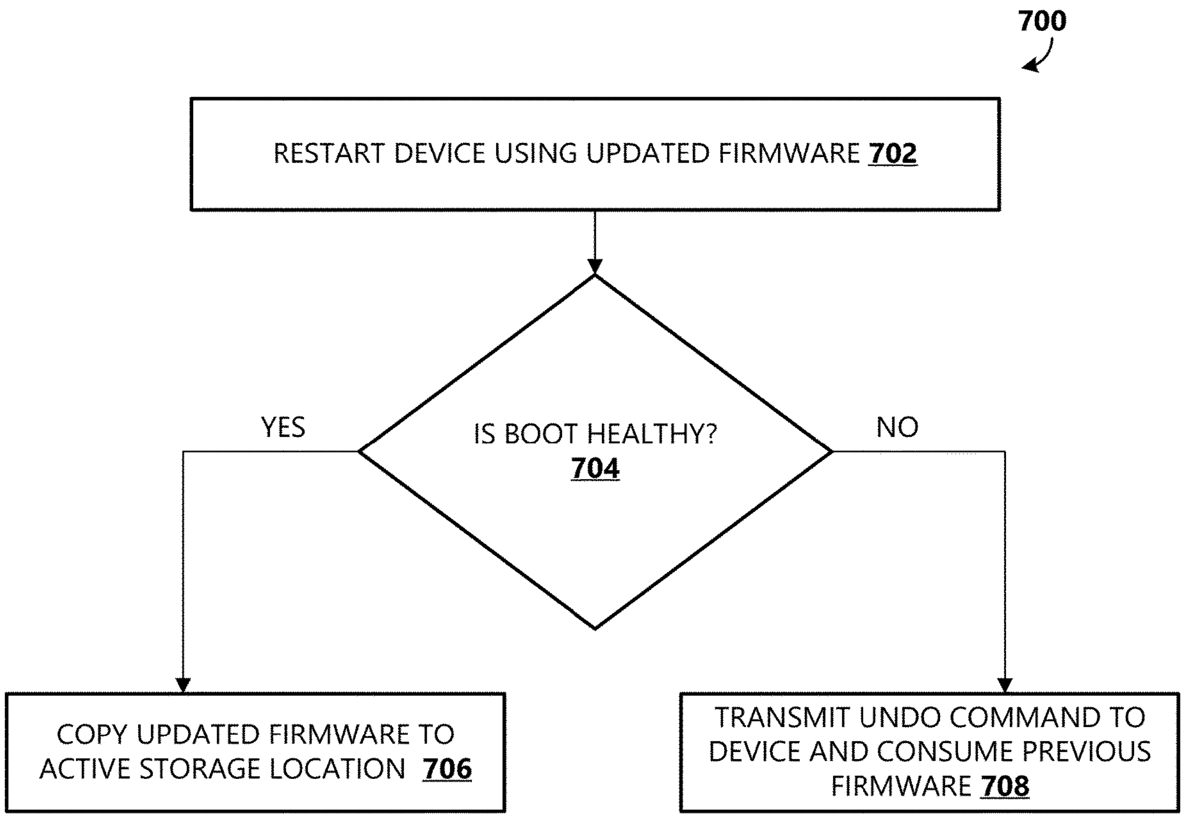
FIG. 7 depicts an example method for managing firmware activation on a computing system.

FIG. 7 depicts an example method for managing firmware activation on a computing system.

At operation 702, a firmware device (e.g., firmware device 126 of FIG. 1) is requested to restart in order to consume an updated version of firmware (e.g., the updated firmware 323 of FIG. 3) on the firmware device. In examples, an ROT (e.g., ROT 124 of FIG. 1) transmits a restart command to the firmware device. A computing device (e.g., computing system 120 of FIG. 1) containing the firmware device or associated with the firmware device may be restarted to restart the firmware device. Alternatively, the computing device will remain active, and one or more components of the computing device will be restarted to restart the firmware device. For instance, one or more dependent components of the firmware device (e.g., components that depend on the firmware device or components that the firmware device depends on) may be restarted.

At operation 704, the ROT monitors the health of the boot-up process of the firmware device. In examples, firmware device transmits a status update of each step of the boot-up process to the ROT. The ROT may expect the status updates of each boot step of the boot-up process to be provided at predefined time intervals (e.g., every second or every minute). The ROT may determine the boot-up of the firmware device is unsuccessful if the ROT does not receive a status update of a step of the boot-up process within a predefined time interval.

The ROT evaluates the status updates of each step of the boot-up process to determine a boot-up health result for the firmware device. The health result may include information related to the attempted activation of the updated version of firmware (e.g., an activation result, the activation time/data, an amount of time taken to activate the updated version of firmware, a storage location of the updated version of firmware and/or the current version of firmware). In examples, one or more verification processes, such as stability tests, may be executed to confirm the successful activation of firmware. Stability tests may include unit tests to confirm that a device installed with the updated version of firmware is working as expected or as intended. In some examples, stability tests may include security checks and/or test the performance and quality of test results.

If the ROT determines the boot-up of the firmware device is successful, then method 700 proceeds to operation 706. If the ROT determines the boot-up of the firmware device is unsuccessful, then method 700 proceeds to operation 708.

At operation 706, the ROT generates a copy command to copy the updated version of firmware to an active location. An active location is a storage location or a portion of a storage location that is accessed by a firmware device upon restarting. For example, an updated version of firmware in an active location refers to a first partition (e.g., primary firmware slot 227 of FIG. 2) or a non-volatile storage location (e.g., firmware non-volatile storage(s) 226 of FIG. 2). In examples, copying the updated firmware to the active location causes a previous version of the firmware to be copied to a separate storage location.

At operation 708, the ROT transmits an undo (e.g., revert) command to the firmware device. The undo command causes the firmware device to revert to a previous version of the firmware. In examples, the undo command includes information for identifying the previous version of the firmware (e.g., a firmware name/version, a storage location, a memory address, an activation or deactivation date/time). The information in the undo command may also include the software code of the previous firmware version. In some examples, the undo command is transmitted to the firmware device by an orchestrator (e.g., orchestrator 112 of FIG. 1). The orchestrator may determine the information to include in the undo command based on a firmware payload transmission history or a most recent snapshot of the operating state of the firmware device.

In some examples, the undo command may include a list of computing devices (e.g., computing system 120 of FIG. 1) and firmware devices (e.g., firmware device 126 of FIG. 1) on which the firmware will be rolled back. The undo command may skip the computer systems and devices that successfully booted as requested in operation 702. In some examples, the undo command may include computer systems that are no longer functioning or are no longer functioning as expected after activating the firmware on the firmware device.

Figure 8:
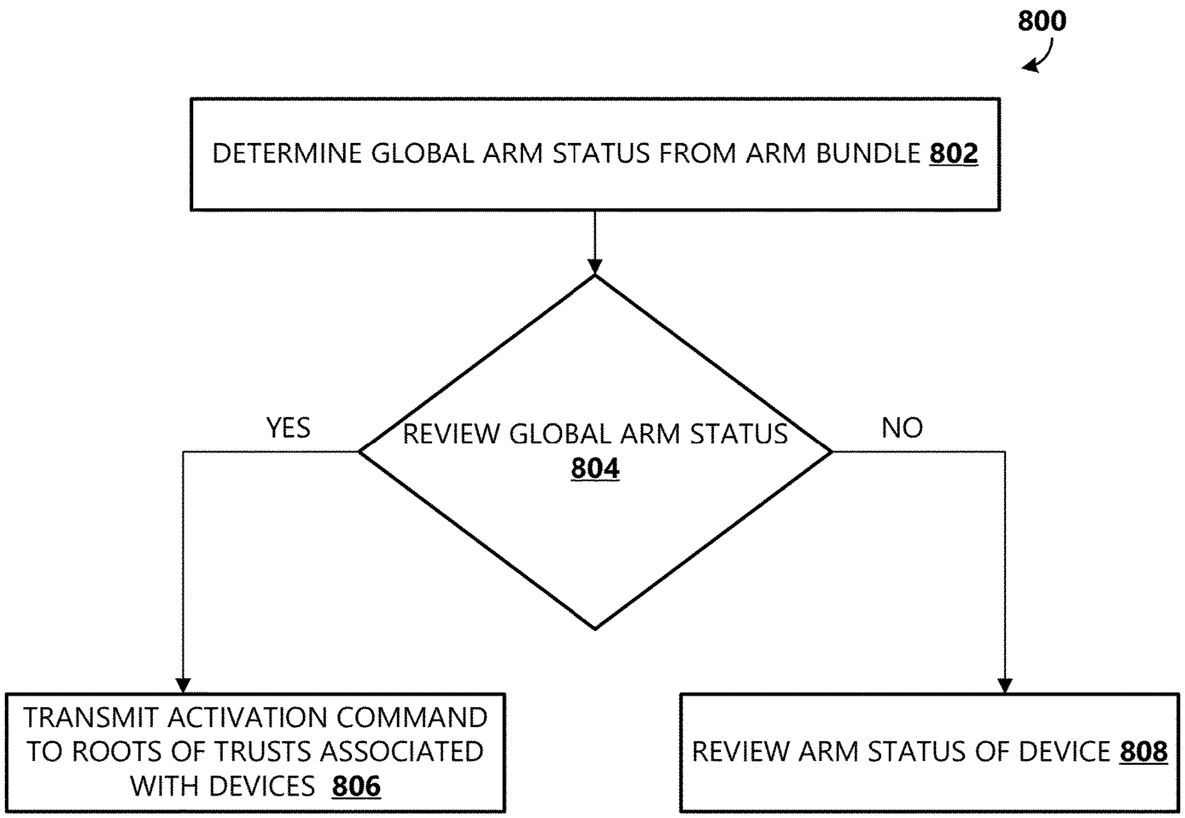
FIG. 8 depicts an example method for managing multi-level firmware activation on a computing system.

FIG. 8 depicts an example method for managing multi-level firmware activation on a computer system (e.g., computing system 120 of FIG. 1). Components of system 100 may execute method 800 to determine if a shared arm status can be used to activate one or more firmware devices (e.g., firmware device 126 of FIG. 1).

At operation 802, an ROT determines the existence of a global arm status within an arm bundle included as part of the firmware payload transmitted by the orchestration component (e.g., orchestrator 112 of FIG. 1) to the computer system. The ROT determines if the global arm status is targeted at a certain ROT level. If the global arm status is targeted at a particular ROT level, the ROT may pass the global arm status to the particular ROT level. For example, a rack-level ROT (e.g., the rack ROT 510 of FIG. 5) may pass the global arm status to a targeted platform-level ROT (e.g., the platform ROT 520 of FIG. 5) to activate firmware devices managed by the platform level ROT.

At operation 804, the targeted ROT reviews the global arm status. The targeted ROT determines whether the global arm status indicates that the firmware is not armed for activation. If the global arm status indicates that the firmware is armed for activation, method 800 proceeds to operation 806. If the global arm status indicates that the firmware is not armed for activation, then method 800 proceeds to operation 808.

At operation 806, the targeted ROT transmits an activation command to an ROT that manages the firmware devices. For example, a platform-level ROT transmits an activation command to device-level ROTs (e.g., device ROT 532 and 534 of FIG. 5) to activate firmware on the devices managed by the device-level ROTs. In examples, the ROT that manages the firmware devices transmits the activation command directly to firmware devices to activate the firmware.

At operation 808, the targeted ROT passes the arming task to a lower level upon determining that the global arm status indicates that the firmware is not armed for activation. For example, a platform-level ROT passes the arming task to one or more device-level ROTs. The device-level ROTs may then activate the firmware on devices associated with device-level ROTs. In some examples, the computing system may have multiple levels of ROTs (e.g., three ROT levels: rack ROT 510, platform ROT 520 and 525, and device ROT 532, 534, 536, and 538 as shown in FIG. 5). Computing system with multiple levels of ROT checks for arm status flags at a lower level if the global arm status flag (not illustrated in FIG. 8) at the current level is missing or false. The lower level may include a different global arm status flag associated with a subset of the devices of the total devices associated with the upper level ROT. Computing system may continue to review global arm status at each level until reaching the device level ROT.

When receiving an activation command, the ROT reviews the arm status. An example interpretation of an arm status is described in the description of method 800 above. Upon confirming the arm status, the ROT communicates with a firmware device to consume the updated version of the firmware. A detailed description of the example process for handling receipt of an activation command is described in method 700 above. The ROT determines the targeted level of global arm status as described in method 800 above prior to activating firmware based on confirmation in method 700.

FIG. 9 is a block diagram illustrating the physical components (e.g., hardware) of a computing device 900 with which examples of the present disclosure may be practiced. The computing device components described below may be suitable for one or more of the components of the systems described above. In a basic configuration, the computing device 900 includes at least one processing unit 902 and a system memory 904. Depending on the configuration and type of computing device 900, the system memory 904 may comprise volatile storage (e.g., random access memory), non-volatile storage (e.g., read-only memory), flash memory, or any combination of such memories. The system memory 904 may include an operating system 905 and one or more program modules 906 suitable for running software applications 950 (e.g., orchestrator 112 of FIG. 1) and other applications.

The operating system 905 may be suitable for controlling the operation of the computing device 900. Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 may perform processes including one or more of the stages of methods 600, 700, and 800 illustrated in FIGS. 6-8. Other program modules that may be used in accordance with examples of the present disclosure and may include applications such as search engines and database applications, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 900 on the single integrated circuit (chip). Examples of the present disclosure may also be practiced using other technologies capable of performing logical operations such as, for example, AND, OR, and NOT, including mechanical, optical, fluidic, and quantum technologies.

The computing device 900 may also have one or more input device(s) 912 such as a keyboard, a mouse, a pen, a sound input device, a touch input device, a camera, etc. The output device(s) 914 such as a display, speakers, a printer, etc. may also be included. The aforementioned devices are examples and others may be used. The computing device 900 may include one or more communication connections 916 allowing communications with other computing devices 918. Examples of suitable communication connections 916 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 904, the removable storage device 909, and the non-removable storage device 910 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer readable media may be part of the computing device 900. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to staged firmware activation on distributed computer nodes. The system includes a device executing a firmware, an update agent to aid in staging the firmware, a root of trust coupled with the update agent to activate the firmware, an orchestrator connected to the update agent over a network to coordinate firmware updates on the device, at least one processor, and memory coupled to the processor, the memory consisting of computer executable instructions that are executed by the system to perform operations. The operation include: prepare a firmware payload with an updated firmware and an arm bundle, stage the firmware payload to the update agent, causing the update agent to perform operations comprising, transmit the updated firmware in the firmware payload to the device, determine an arm status based on the arm bundle, transmit the arm status to the root of trust, transmit an activation command to the root of the trust, causing the root of trust to perform operations including: review the arm status of the updated firmware, and in response to the arm status being true, transmit a consume command to the device to consume the updated firmware.

In an example, the operations further include: copy the updated firmware to an active location for the device to automatically consume upon restarting.

In an example, the operations further include: in response to the arm status of the device set to false, transmit a consume command to the device to consume firmware executed prior to receipt of the activation command.

In an example, transmitting the updated firmware in the firmware payload to the device further includes: copying the updated firmware to a volatile memory accessible to the device.

In an example, transmitting the updated firmware in the firmware payload to a device further includes: copying the updated firmware to a temporary location not accessible to the device. In another example, the temporary location is an inactive partition of a storage location. In still another example, the storage location contains firmware in an active partition consumed by the device prior to receiving the consume command. In yet another example, transmitting the updated firmware in the firmware payload to the device further includes: copying the updated firmware from the inactive partition location to the active partition. In a further example, reviewing the arm status of the updated firmware further includes: confirming version of firmware in the inactive partition is the updated firmware, confirming version of firmware in the active partition is an existing firmware consumed by the device prior to receiving the consume command, setting the arm status associated with the device to true. In still further example, storage location is a non-volatile storage.

In another aspect, the technology related to a computer-implemented method for staged firmware activation on distributed computer nodes. The method includes: preparing a firmware payload with an updated firmware and an arm bundle, staging the firmware payload to an update agent, causing the update agent to perform operations including: transmitting the updated firmware in the firmware payload to a device, determining an arm status based on the arm bundle, transmitting the arm status to a root of trust, transmitting an activation to the root of the trust, causing the root of trust to perform operations including: reviewing the arm status of the updated firmware, and in response to the arm status being true, transmitting a consume command to the device to consume the updated firmware.

In an example, transmitting the consume command to the device to consume the updated firmware includes: restarting the device to boot using the updated firmware, reviewing status of the boot, and in response to the status of the boot being healthy, copy the updated firmware to an active location for the device to automatically consume upon restarting.

In still another aspect, the technology relates to a method for staged firmware activation on distributed computer nodes. The method includes: receiving a firmware payload with firmware and an arm status associated with the firmware, installing the firmware on a device of a computing system, transmitting the arm status to a root of trust associated with the computing system, wherein the root of trust manages firmware activation for the device, receiving an activation request to activate the firmware on the device, in response to receiving the activation request, determining that the arm status indicates the firmware is armed for activation on the device, and activating the firmware on the device.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system comprising:
- a device executing a firmware;
- an update agent to aid in staging the firmware;
- a root of trust coupled with the update agent to activate the firmware;
- an orchestrator connected to the update agent over a network to coordinate firmware updates on the device;
- at least one processor; and
- memory coupled to the processor, the memory consisting of computer executable instructions that, when executed by the system, perform operations comprising:
  - prepare a firmware payload with an updated firmware and an arm bundle, wherein the arm bundle comprises an arm status that determines a condition to activate the updated firmware and an indication of whether to activate the updated firmware;
  - stage the firmware payload to the update agent, causing the update agent to perform operations comprising:
    - transmit the updated firmware in the firmware payload to the device; and
    - transmit the arm status to the root of trust; and
  - transmit an activation command to the root of trust, causing the root of trust to perform operations comprising:
    - determine the condition to activate the updated firmware is satisfied;
    - determine the indication of whether to activate the updated firmware specifies activating the updated firmware; and
    - transmit a consume command to the device to consume the updated firmware.

2. A system of claim 1, wherein the operations further comprise:
- copy the updated firmware to an active location for the device to automatically consume upon restarting.

3. The system of claim 1, wherein the operations further comprise:
- in response to determining the arm status of the device is set to false, transmit a consume command to the device to consume firmware executed prior to receipt of the activation command.

4. A system of claim 1, wherein transmitting the updated firmware in the firmware payload to the device further comprises:
- copying the updated firmware to a volatile memory accessible to the device.

5. A system of claim 1, wherein transmitting the updated firmware in the firmware payload to a device further comprises:
- copying the updated firmware to a temporary location not accessible to the device.

6. A system of claim 5, wherein the temporary location is an inactive partition of a storage location.

7. A system of claim 6, wherein the storage location contains firmware in an active partition consumed by the device prior to receiving the consume command.

8. A system of claim 7, wherein transmitting the updated firmware in the firmware payload to the device further comprises:
- copying the updated firmware from the inactive partition location to the active partition.

9. The system of claim 7, wherein determining the indication of whether to activate the updated firmware specifies activating the updated firmware comprises:
- confirming a version of firmware in the inactive partition is the updated firmware;
- confirming a version of firmware in the active partition is an existing firmware consumed by the device prior to receiving the consume command; and
- setting the arm status associated with the device to true.

10. A system of claim 6, wherein the storage location is a non-volatile storage.

11. A system of claim 1, wherein transmitting the consume command to the device to consume the updated firmware further comprises:
- restarting the device to boot using the updated firmware;
- reviewing status of the boot; and
- in response to the status of the boot being healthy, copying the updated firmware to an active location for the device to automatically consume upon restarting.

12. The system of claim 1, wherein the operations further comprise:
- restarting the device to boot using the updated firmware;
- reviewing status of the boot; and
- in response to the status of the boot being not healthy, transmitting an undo command to the device to consume firmware executed prior to receipt of the activation command.

13. The system of claim 1, wherein transmitting the activation command the root of the trust is caused by an external activation of system restart.

14. The system of claim 1, wherein transmitting the updated firmware in the firmware payload to the device further comprises:
- identifying a level of a management controller relevant for staging the firmware payload; and
- transmitting the updated firmware in the firmware payload to one or more devices managed by the management controller.

15. The system of claim 14, wherein the operations further comprise:
- reviewing the arm status of the updated firmware by:
- determining a global arm status from the arm bundle;
- reviewing the global arm status; and
- in response to determining the global arm status is set to true, transmitting an activation command to one or more root of trusts associated with the one or more devices.

16. The system of claim 14, wherein the operations further comprise:

determining a global arm status from the arm bundle;

reviewing the global arm status; and in response to determining the global arm status is set to false or is empty, reviewing an arm status of a device of the one or more devices.

17. The system of claim 16, wherein the operations further comprise:

restarting each device of the one or more devices to boot using the updated firmware;

reviewing the status of the boot of each device; and in response to determining the status of the boot of a device of the one or more devices is not healthy, transmitting an undo command to the one or more devices to consume firmware executed prior to receipt of the activation command.

18. A computer-implemented method for performing staged activation of a firmware update, the method comprising:

preparing a firmware payload with an updated firmware and an arm bundle, wherein the arm bundle comprises an arm status that determines a condition to activate the updated firmware and an indication of whether to activate the updated firmware;

staging the firmware payload to an update agent, causing the update agent to perform operations comprising:

transmitting the updated firmware in the firmware payload to a device; and transmitting the arm status to a root of trust; and transmitting an activation to the root of the trust, causing the root of trust to perform operations comprising:

determining the condition to activate the updated firmware is satisfied;

determining the indication of whether to activate the updated firmware specifies activating the updated firmware; and transmitting a consume command to the device to consume the updated firmware.

19. The method of claim 18, wherein transmitting the consume command to the device to consume the updated firmware further comprises:

restarting the device to boot using the updated firmware;

reviewing status of the boot; and in response to determining the status of the boot indicates the device performed a healthy boot of the updated firmware, copying the updated firmware to an active location for the device to automatically consume upon restarting.

20. A method comprising:

receiving a firmware payload with firmware and an arm status associated with the firmware, wherein the arm status determines a condition to activate the firmware payload and an indication of whether to activate the firmware payload;

installing the firmware on a device of a computing system;

transmitting the arm status to a root of trust associated with the computing system, wherein the root of trust manages firmware activation for the device;

receiving an activation request to activate the firmware on the device;

in response to receiving the activation request:

determining that the condition to activate the firmware payload is satisfied; and determining the indication of whether to activate the firmware payload specifies activation of the firmware payload on the device; and activating the firmware on the device.

* * * * *